United States Patent [19]
Johnson

[11] 3,782,115
[45] Jan. 1, 1974

[54] METHOD AND APPARATUS FOR REDUCING NITROGEN OXIDE AIR POLLUTION

[76] Inventor: Cecil J. Johnson, 314 N. Chauncey St., Columbia City, Ind. 46725

[22] Filed: Sept. 30, 1970

[21] Appl. No.: 77,045

Related U.S. Application Data

[63] Continuation-in-part of Ser. No. 776,973, Nov. 19, 1968, abandoned.

[52] U.S. Cl.............. 60/274, 55/1, 55/267, 55/DIG. 30, 60/309, 60/320, 423/212
[51] Int. Cl.............................. F01n 3/02
[58] Field of Search............ 60/29 F, 31, 309, 60/320, 311, 274; 55/97, 257, 268, DIG. 30, 267, 1; 23/159, 161; 423/212, 235

[56] References Cited
UNITED STATES PATENTS

| | | | |
|---|---|---|---|
| 1,388,480 | 8/1921 | Paris | 60/31 |
| 1,653,603 | 12/1927 | Schroder | 60/31 |
| 2,115,228 | 4/1938 | Lundquist | 60/29 F |
| 2,966,036 | 12/1960 | Stowens | 60/31 |
| 3,153,579 | 10/1964 | Levey | 60/31 |
| 3,389,972 | 6/1968 | Pottharst | 60/31 |
| 3,456,439 | 7/1969 | Hale | 60/31 |

*Primary Examiner*—Douglas Hart
*Attorney*—John J. Byrne

[57] ABSTRACT

A method and apparatus for reducing the nitrogen dioxide content of internal combustion engine exhaust gases by cooling the gases, condensing the water vapor therein and dissolving and taking off the nitrogen dioxide in the water condensate.

1 Claim, 1 Drawing Figure

PATENTED JAN 1 1974  3,782,115
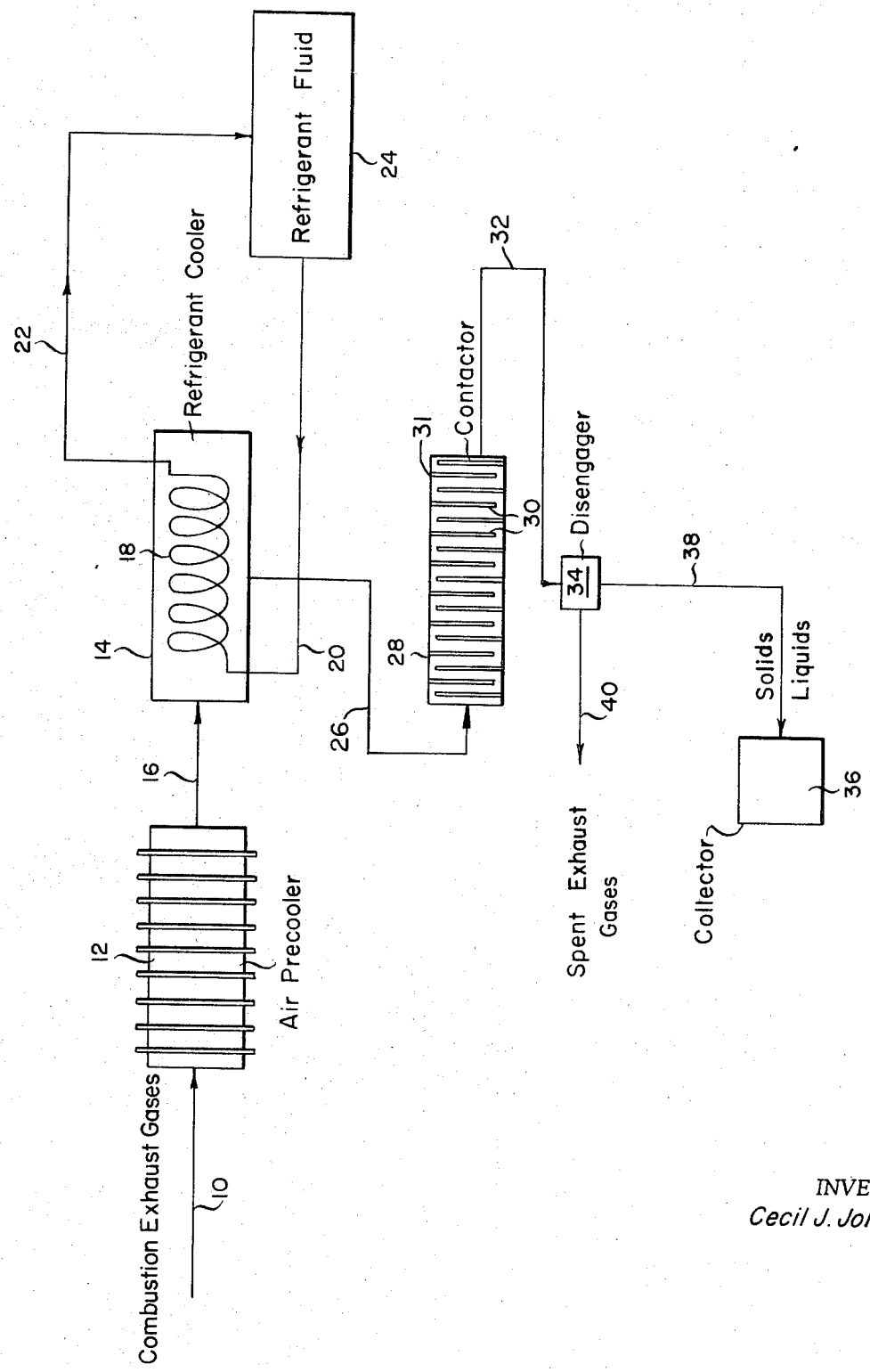
INVENTOR
Cecil J. Johnson

METHOD AND APPARATUS FOR REDUCING NITROGEN OXIDE AIR POLLUTION

This is a continuation-in-part of my co-pending application Ser. No. 776,973, filed Nov. 19, 1968, entitled METHOD FOR REDUCING NITROGEN OXIDE AIR POLLUTION now abandoned.

This invention relates to a process and apparatus for purifying the exhaust gases emitted from an internal combustion engine. More specifically, it relates to the removal of nitrogen dioxide from the exhaust gases prior to their being vented to the atmosphere.

Air pollution has in recent years come to the forefront among health hazards confronting the citizens of our country. One of the major contributors to our air pollution problems is the automobile which emits its toxic fumes in our crowded city streets. As the number of automobiles increases yearly and our air pollution problems get worse, many ideas for solving the pollution problem rise to the surface. The ideas, too numerous to mention, include, generally, mechanical filter devices located at various points throughout the exhaust system of an automobile or elaborate afterburner arrangements for more fully consuming the products of combustion egressing from the manifold of an internal combustion engine. None of the earlier devices or methods have proven to be either practical or capable of performing the job for which they were intended. Applicant, by this invention, proposes a process for purifying exhaust gases whereby undesirable nitrogen dioxide is removed from the gas stream by chemical reactions prior to the gases entering the atmosphere.

The removal of nitrogen dioxide, $NO_2$, from the exhaust fumes of an internal combustion engine substantially assures the emission of much less toxic stream of gases to the atmosphere. Nitrogen dioxide is a poisonous reddish-brown gas at ordinary temperatures. It is formed by the reaction of nitric oxide, NO with oxygen, $O_2$ ($2NO + O_2 \rightarrow 2NO_2$). Nitric oxide is only slightly soluble in water but it is known that nitrogen dioxide dissolves in water to form nitric acid, $H_2O + 3NO_2 \rightarrow 2HNO_3 + NO$.

Applicant proposes by this invention to provide a process and apparatus whereby nitrogen dioxide in the exhaust gases of an internal combustion engine may be dissolved in water, thereby ridding the exhaust gas stream of a substantial portion of the highly undesirable and toxic nitrogen dioxide while at the same time forming a useful by-product, nitric acid.

It is an object of this invention to provide a process and apparatus for treating the exhaust gases of an internal combustion engine whereby the exhaust gases are cooled, first by an air precooler and then by a refrigerant cooler, and a substantial portion of the water vapor present in the exhaust gas stream condenses. The exhaust gas stream is then passed through a contactor whereby the gases are caused to intermingle with the condensed water. Nitrogen dioxide in the gases is dissolved to form nitric acid as shown by the formulas above. The nitric acid may be collected by suitable collection means and thereafter used for any number of purposes for which nitric acid is known to be valuable. For example, nitric acid is used in the manufacture of practically all explosives. Further, many nitrates can be obtained from nitric acid, which nitrates are used as fertilizers. Nitric acid is also used in the manufacture of dyes, plastics and lacquers. The remaining portion of the exhaust gas stream minus a large portion of the nitrogen dioxide originally contained therein is emitted to the atmosphere.

These and other objects of the invention will become more apparent to those skilled in the art by reference to the following detailed description when viewed in light of the accompanying drawing wherein:

This FIGURE shows schematically the steps of the process of this invention.

Referring to the drawings, combustion gases enter the air precooler 12 by means of line 10. The air precooler may be in the form of a finned tube in suitable position as to be in heat exchange contact with the surrounding air as is well known in the heat exchange art. The precooled exhaust gases flow from the air precooler 12 to refrigerant cooler 14 via line 16. The refrigerant cooler may consist of a chamber having desposed therein a cooling coil 18 connected by entrance line 20 and exit line 22 to a refrigeration system 24 which supplied cold refrigerant to the refrigerant cooler 14 for purposes of further cooling the exhaust gases. The refrigeration system of the automobile air conditioner may be utilized. When the exhaust gases exit from the precooler 12, the water vapor contained therein has begun to condense into the liquid state. After the gas is passed through the refrigerant cooler 14, the water vapor and small concentrations of hydrocarbon are substantially completely condensed into the liquid state. The exhaust gases and condensate flow through line 26 to contactor 28. The contactor 28 is of conventional construction and includes a plurality of staggered baffles 30 spaced longitudinally within the housing 31. The condensed liquids, small concentrations of hydrocarbon, etc., enter the contactor 28 through line 26 and follow a sinuous path around the baffles and through contactor and exit through line 32. Due to the sinuous path that the liquids and gases are caused to follow, and due to the impinging of the liquids and gaseous particles against the baffle plates, good contact is achieved between the vapors and gases enhancing the dissolution reaction of nitrogen dioxide in water to form a weak solution of nitric acid. Preferably, the contactor is of a material that will withstand the corrosive nature of nitric acid. The nitric acid formed by the reaction and other liquids and solids leave the contactor 28 along with the exhaust gases via line 32 and enter the disengager 34 which may be in the form of a cyclone whereby the heavier nitric acid and other liquids and solids are separated from the gas stream and flow downwardly to a suitable collector 36 via line 38. The residual exhaust gases egress from the disengager 34 via line 40 and continued out through the exhaust system of the automobile into the atmosphere substantially free of the undesirable nitrogen dioxide.

The process may be more fully understood with reference to the following examples:

EXAMPLE NO. 1

Exhaust gas from air internal combustion engine which contained 106 ppm of nitrogen oxide (calculated as $NO_2$) and which was saturated with water vapor at 475° F. was cooled in the air precooler to 180° F. The gas was further cooled in the refrigerant cooler to 90° F. and it was then passed through the contactor. There was sufficient water condensate over a period of eight hours of operation to reduce the steady state $NO_2$ pollution to 14 ppm. Further reduction of $NO_2$ was ob-

EXAMPLE NO. 2

Exhaust gas from an internal combustion engine which container 1,272 ppm of nitrogen oxide (calculated at $NO_2$) and which was nearly saturated with water vapor at 865° F. was cooled in the air cooler to 196° F. The gas was further cooled in the refrigerant cooler to 90° F. and it was then passed through the contactor. There was sufficient water condensate over a period of four hours of operation to reduce the steady state $NO_2$ pollution to 78 ppm. Further reduction of $NO_2$ was obtained by utilizing lower temperature refrigerant conditions.

EXAMPLE NO. 3

Exhaust gas from an internal combustion engine which contained 5,750 ppm. of nitrogen oxides (calculated as $NO_2$) and which was nearly saturated with water vapor at 925° F. was cooled in the air cooler to 205° F. The gas was further cooled in the refrigerant cooler to 102° F. and it was then passed through the contactor. There was sufficient water condensate over a period of three hours of operation to reduce the steady state $NO_2$ pollution to 147 ppm. Further reduction of $NO_2$ was obtained by utilizing lower temperature refrigerant conditions.

In a general manner, while there has been disclosed an effective and efficient embodiment of the inveniton, it should be well understood that the invention is not limited to such an embodiment as there might be changes made in the arrangement, disposition, and form of the parts without departing from the principle of the present invention as comprehended within the scope of the accompanying claims.

I claim:

1. A process for removing nitrogen dioxide from the exhaust gases of internal combustion engines comprising the steps of cooling the exhaust gases by first passing the gases through an air-cooled precooling device and then through a refrigerant cooler thereby condensing the water vapors therein, passing the exhaust gases and condensate through a contactor comprising a series of contact plates for facilitating dissolution of nitrogen dioxide in the water, separating the gases and nitrogen-dioxide containing liquid in a cyclone separator, said separating step constituting the only withdrawal of liquid from the exhaust gases, and collecting the separated liquids in a storage unit.

* * * * *